United States Patent Office 3,511,914
Patented May 12, 1970

3,511,914
THROAT LOZENGE VEHICLE
Hal N. Wolkoff, Bloomfield, and George Pinchuk, Jersey City, N.J., assignors to Schering Corporation, Bloomfield, N.J., a corporation of New Jersey
No Drawing. Filed Jan. 31, 1967, Ser. No. 612,827
Int. Cl. A61j 3/06
U.S. Cl. 424—263                                          4 Claims

ABSTRACT OF THE DISCLOSURE

A pleasingly flavored medicated lozenge capable of dissolving slowly and uniformly in the mouth comprising a major amount of polyethylene glycol and having uniformly distributed therein medicament, artificial sweetener, and excipients.

BACKGROUND OF THE INVENTION

Field of the invention

This invention relates to new and useful improvements in pharmaceutical formulations and, more particularly, to a new and improved vehicle for throat lozenges.

Description of the prior art

Heretofore, the most popular and most satisfactory throat lozenges available have been those prepared by dissolving or dispersing one or more medicaments in a hard candy base which is then moulded into desired tablet forms. The primary advantages of this type of lozenge is its slow rate of dissolution and its smooth texture which is retained throughout the course of dissolving. Such lozenges, however, have several important disadvantages including:

(1) Development, manufacturing and handling of this dosage form requires production techniques and equipment not generally available in the pharmaceutical industry.

(2) The medicaments must be added to the candy base while it is in its molten form. Therefore, heat labile medicaments frequently deteriorate during processing.

(3) Lozenges made in this fashion have a tendency to clump together. It is necessary, therefore, either to tolerate this clumping or to individually wrap each lozenge.

(4) It is generally very difficult, if not impossible, to get uniform distribution of medicament throughout the candy base by techniques conventionally employed in blending.

(5) Production costs for this type of lozenge are significantly greater than for lozenges prepared by the direct compression technique.

Although less widely employed than the candy based lozenge, lozenges are frequently made by dispersing medicinal agents in conventional sugar based tablets. Unfortunately, while the sugar based tablets substantially overcome all of the disadvantages noted above for the candy based lozenge, they do only at the loss of the principal advantage of the hard candy lozenge. The rate at which a conventional sugar based tablet dissolves is quite difficult to control and, more importantly, it dissolves unevenly producing a rough, unpleasant mouth feel.

DESCRIPTION OF THE INVENTION

It is the object of the instant invention, therefore, to provide a new vehicle for throat lozenges which will unite the advantages of both types of lozenges commonly employed in the art while being substantially free of their associated disadvantages. More particularly, it is the object of this invention to provide a vehicle for throat lozenges which will have the following characteristics:

(1) a melting point sufficiently low so that the material fuses under compression on a convention tableting machine;

(2) a water solubility which provides a gradual dissolution in mouth fluids;

(3) is capable of being pleasingly flavored and has no inherent strong, objectionable taste;

(4) is chemically and physically compatible with those medicaments commonly employed in buccal formulations; and (5) is non-toxic and safe for oral ingestion.

Applicants have found that these and other objects can be achieved by employing as the major component in a lozenge formulation a member of the group consisting of polyethylene glycol polymers having an average molecular weight of about 1500 to about 20,000. These polyethylene glycol polymers generally are white powders or granules with a somewhat waxy texture having little or no inherent flavor and usually melting in the range from about 35° to about 70° C. They are readily available commercially in pharmaceutical grade purity and are both inert to the medicaments commonly employed in buccal formulations and free of toxic manifestations upon oral ingestion. Applicants have found that lozenges incorporating these polyethylene glycol polymers as the essential vehicle component can be prepared using conventional pharmaceutical equipment as well as conventional tableting techniques and that they have the dissolution and mouth feel qualities of hard candy based lozenges. Particularly desirable results are obtained when polyethylene glycol polymers having an average molecular weight of about 4,000 to about 6,000 are employed.

In general, the lozenge formulations contemplated by the instant invention are those wherein the polyethylene glycol polymer constitutes a major component of the preparation. The polymer, however, need not be present in excess of 50 percent of the final formulation. Satisfactory results are obtained when the polymer constitutes at least about 40 percent by weight of the final formulation with a minimum of about 60 percent by weight being generally preferred. It is contemplated that the remainder of the lozenge formulation will be made up of a minor proportion of one or a mixture of medicaments commonly employed in lozenge formulations such as, for example, antibacterial agents, including hexylresorcinol, chlorhexidine, meta-cresylacetate and cetylpyridinium chloride; and/or topical anesthetics, including benzocaine, propylaminobenzoate, tetracaine, piperocaine, dibucaine, butacaine sulfate and menthol; together with one or a mixture of conventional excipients including lubricants such as, for example, citric acid, confectioners sugar, mannitol, lactose, talc and magnesium stearate; binders such as, for example, methyl cellulose and polyvinylpyrrolidone; sweeteners such as, for example, sucaryl, saccharin, hexamic acid and natural and synthetic sugars; flavors, dyes, etc.

SUMMARY OF THE INVENTION

In its composition aspect, therefore, the instant invention may be described as residing in the concept of throat lozenge formulations comprising as the essential vehicle component at least about 40 percent by weight of a member selected from the group consisting of polyethylene glycol polymers having an average molecular weight of about 1,500 to about 20,000.

DESCRIPTION OF PHYSICAL EMBODIMENTS

As pointed out above, lozenges incorporating the improved vehicle of this invention may be prepared on conventional pharmaceutical equipment employing conventional tableting techniques. Choice of technique will depend largely upon the available facilities and equipment. The following examples will illustrate the best mode contemplated by applicants for carrying out their invention and will demonstrate the applicability of conventional tableting techniques to typical lozenge formulations. These examples are illustrative merely and no limitation is intended except as set forth in the appended claims.

LOZENGE FORMULATIONS

| Ingredient | Formula, mg. per lozenge | | | | | |
|---|---|---|---|---|---|---|
| | I | II | III | IV | V | VI |
| Cetylpyridinium chloride | 2.2 | | | | | |
| Hexylresorcinol.HCl | | 2.5 | | | 2.5 | |
| Chlorhexidine.2HCl | | | 5.0 | | | |
| Meta-cresylacetate | | | | 3.0 | | 3.0 |
| Benzocaine | 2.0 | | | | | |
| Propyl aminobenzoate | | 3.0 | | | | |
| Tetracaine.HCl | | | | 1.0 | | |
| Piperocaine.HCl | | | | | 2.0 | |
| Dibucaine.HCl | | | | 1.0 | | |
| Butacaine sulfate | | | | | | 2.0 |
| Menthol | 2.0 | 2.0 | 2.0 | 2.0 | 2.0 | 2.0 |
| Polyethylene Glycol 6000 | 1,445.0 | 1,445.0 | 1,445.0 | 1,445.0 | 1,445.0 | 1,455.0 |
| Confectioners sugar | 377.8 | 376.5 | 376.0 | 378.0 | 377.5 | 377.0 |
| FDC dy | 5.0 | 5.0 | 5.0 | 5.0 | 5.0 | 5.0 |
| Sucaryl-saccharin mix | 30.0 | 30.0 | 30.0 | 30.0 | 30.0 | 30.0 |
| Citric acid | 20.0 | 20.0 | 20.0 | 20.0 | 20.0 | 20.0 |
| Magnesium stearate | 10.0 | 10.0 | 10.0 | 10.0 | 10.0 | 10.0 |
| Flavor, q.s | 6.0 | 6.0 | 6.0 | 6.0 | 6.0 | 6.0 |
| Total weight (mg.) | 1,900.0 | 1,900.0 | 1,900.0 | 1,900.0 | 1,900.0 | 1,900.0 |

Wet granulating technique

Mix all ingredients together except the magnesium stearate. Screen the mixture to insure uniformity. Granulate the mixture with water (alcohol or hydro-alcoholic mixture may be used) until damp granules are formed. Pass the granules through a suitable size screen onto a tray. Dry in an oven. Reduce the dried granulation to uniform particle size by screening. Add the magnesium stearate and mix. Compress on a pharmaceutical tableting machine to desired weight and shape.

Dry mixing technique

Dry mix all ingredients. Screen to insure uniformity and compress directly on a pharmaceutical tableting machine to desired weight and shape.

Spray drying technique

Dry mix all ingredients. Screen to insure uniformity and suspend the mixture in a hydro-alcoholic system with high speed agitation. Pump into a spray drier and collect the spray dried material. Compress on a pharmaceutical tableting machine to desired weight and shape.

Spray congealing technique

Dry mix all ingredients except the polyethylene glycol and the flavor. Melt the polyethylene glycol and add the flavor. Add the dry mixed ingredients to the melt and blend thoroughly. Pump the melt into a spray drier and collect the congealed particles (alternatively the melt can be congealed on trays and then ground). Compress on a pharmaceutical tableting machine to desired weight and shape.

Lozenges prepared according to any of these techniques are substantially identical in appearance. All resemble in texture and feel the conventional candy based lozenge. Further, all dissolve slowly and uniformly in the mouth retaining their smooth texture throughout the course of dissolving.

The specific medicaments and the specific excipients employed in the illustrative examples above, apart from the polyethylene glycol polymer, are not critical to this invention. Many variations in these ingredients will suggest themselves to those skilled in the art. Applicants consider all such variations to be the full equivalent of the formulations specifically disclosed and to fall within the scope of this invention.

The subject matter which applicants regard as their invention is specifically pointed out and distinctly claimed as follows:

1. A lozenge capable of slowly and uniformly dissolving in the mouth consisting essentially of conventional amounts of an orally effective dosage quantity of buccal medicament, artificial sweetener, confectioners' sugar, flavors and other conventional throat lozenge excipients uniformly distributed in a major amount of polyethylene glycol having an average molecular weight of about 1500 to 20,000.

2. A lozenge according to claim 1 wherein said average molecular weight is about 4000 to 6000.

3. A lozenge according to claim 1 wherein said buccal medicament comprises an antibacterial agent.

4. A lozenge according to claim 3 wherein said buccal medicament additionally comprises a topical anesthetic.

References Cited

UNITED STATES PATENTS

| | | | |
|---|---|---|---|
| 2,149,005 | 2/1939 | Bockmuhl et al. | 424—132 |
| 2,498,374 | 2/1950 | Martin | 424—271 XR |
| 2,538,127 | 1/1951 | Saunders et al. | 424—358 XR |
| 2,584,166 | 2/1952 | Stevenson et al. | 424—14 |
| 2,854,378 | 9/1958 | Buckwalter | 424—227 |
| 2,975,099 | 3/1961 | Goyan et al. | 424—263 XR |
| 2,987,484 | 6/1961 | Lundberg et al. | 264—328 XR |
| 3,234,091 | 2/1966 | Lang et al. | 424—14 |
| 3,308,217 | 3/1967 | Lowy et al. | 424—227 XR |
| 3,432,592 | 3/1969 | Speiser | 264—328 XR |
| 3,439,089 | 4/1969 | Cherkas et al. | 424—78 |
| 2,540,253 | 2/1951 | Gakenheimer | 424—44 |
| 2,963,404 | 12/1960 | Hammer et al. | 424—180 |
| 3,096,248 | 7/1963 | Rudzki | 264—112 |
| 3,271,256 | 9/1966 | Frey | 424—350 |
| 3,295,992 | 1/1967 | Frey | 99—134 |
| 3,331,696 | 7/1967 | Rieckmann et al. | 106—208 |

S. K. ROSE, Primary Examiner

U.S. Cl. X.R.

424—267, 308, 310, 326, 343, 346